United States Patent [19]

Tallonneau

[11] 4,019,850
[45] Apr. 26, 1977

[54] METHOD FOR THE STORAGE OF LIQUEFIED GAS IN THE PRESENCE OF A FIBROUS ADSORBANT SUPPORT

[75] Inventor: Georges Tallonneau, Avon, France
[73] Assignee: S.T. Dupont, Paris, France
[22] Filed: Oct. 15, 1974
[21] Appl. No.: 515,035
[30] Foreign Application Priority Data
Oct. 12, 1973 France .............................. 73.36495
[52] U.S. Cl. .................................... 431/12; 62/50; 222/1
[51] Int. Cl.² ......................................... F17C 7/02
[58] Field of Search .......... 431/130, 131, 143, 150, 431/276, 277, 344, 12; 62/50, 52; 222/13; 206/.7

[56] References Cited
UNITED STATES PATENTS

| | | | |
|---|---|---|---|
| 2,535,452 | 12/1950 | Quercia et al. | 431/344 |
| 2,573,424 | 10/1951 | Flamn | 222/3 |
| 3,066,514 | 12/1962 | Iketani | 431/344 |
| 3,108,445 | 10/1963 | Portzer et al. | 206/.7 |
| 3,286,491 | 11/1966 | Smith | 62/50 |
| 3,523,006 | 8/1970 | Piffath et al. | 431/344 |
| 3,729,289 | 4/1973 | Bouvier | 431/344 |
| 3,773,168 | 11/1973 | Meinass | 206/.7 |

FOREIGN PATENTS OR APPLICATIONS 897,877   6/1944   France .............................. 431/344

*Primary Examiner*—Carroll B. Dority, Jr.

[57] ABSTRACT

A process for storage of a liquefied gas which is discharged exclusively in a gaseous form into an atmosphere whose pressure is less than the storage pressure. There is disposed in the storage chamber conjointly with the liquefied stored gas, a minimum quantity of a fibrous adsorbant support, the diameter of the fibers being equal at most to 25 microns. The process is applicable to the storage of liquefied gas without need for auxiliary evaporation or auxiliary expansion apparatus.

8 Claims, 3 Drawing Figures

METHOD FOR THE STORAGE OF LIQUEFIED GAS IN THE PRESENCE OF A FIBROUS ADSORBANT SUPPORT

FIELD OF THE INVENTION

The invention relates to improvements in the storage of liquefied gas, for supply exclusively in gaseous form, in cigarette lighters, heating or lighting apparatus, or other such arrangements.

In the present description, the expression "liquefied gas" includes all gases whose critical temperature is greater than the ambient temperature; the expression "apparatus having an exclusively gaseous discharge" or the like refers to apparatus storing liquefied gas in which the gas is released exclusively in the gaseous phase at the time of first use of the apparatus and up to its complete emptying; and the expression "adsorbant support" includes "all fibrous capillary products".

PRIOR ART

It has already been proposed in French Pat. No. 897,877 to provide for storage of a gas in a storage chamber by means of a suitably chosen adsorbant support to return the gas to a pressure in the neighborhood of the pressure of utilization. The patentee thus contemplated an apparatus for exclusive gaseous discharge whose operation would be assured, following the teaching in the patent, of a "simple conduit of very small section advantageously combined with a spigot, or a flap or an obturation valve".

The proposed adsorbant supports were cotton, peat, infusorial earth, silicates, metallic foams, higher homologues of hydrocarbons, in the case of the storage of hydrocarbons, cellulosic material and their derivatives, metallic salts, etc. when the cited gas comprises carbon dioxide, ammonia, oxygen, volatile perfume spirits, butane or analogous products and hydrogen sulfide.

In reality, this construction was never commercialized, either before or after its patenting for apparatus containing a liquefied gas in the presence of an adsorbant support whose discharge was exclusively gaseous and which operated uniquely due to a conduit of very small section. In fact, all apparatus having a system of gas distribution by a conduit of a very small section comprise a metallic mass such that the liquid to be evaporated always receives the necessary heat for its evaporation in spite of the cooling provoked by the evaporation.

In practice, this has never been realized, to the knowledge of the Applicant, in apparatus for purely gaseous discharge utilizing liquefied gas housed in an adsorbant support with the exclusion of any auxiliary apparatus.

It is to be further noted, that in the course of testing by Applicant of the storage of liquefied butane or pentane in contact with cotton, felt, or charcoal, it has been found, on the one hand, that whatever the nature of the adsorbant, the pressure at the interior of the storage receiver is substantially the same as if the liquid had been stored without the adsorbant support, and on the other hand contrary to what seems to be stated in the previous patents, a partial condensation is always produced at the outlet of the reservoir such that fine droplets are present in the discharged gaseous phase.

SUMMARY OF THE INVENTION

An object of the present invention is to provide a method for storing a liquefied gas in an apparatus for discharge exclusively in gaseous phase utilizing exclusively an adsorbant support.

Another object of the present invention is to provide a method of storing a liquefied gas which permits obtaining an exclusively gaseous discharge and at a substantially constant pressure at the outlet of the storage reservoir without utilizing an auxiliary expansion member.

This method is essentially characterized by the fact that there is disposed in the storage chamber, conjointly with the stored liquefied gas, a minimum quantity of a fibrous capillary adsorbant support, the diameter of the fibres being equal at the most to 25 microns, the actual volume, i.e., the volume remaining after deduction of all interstitial spaces of the said minimum quantity, occupying:

(a) at least 2% of the volume of the storage chamber, in the case of capillary fibers loosely entangled with a mean diameter of about 2 microns and varying between 0.5 and 5 microns;

(b) at least 12% of the volume of the storage chamber, in the case of capillary fibers entangled in layers of a mean diameter of about 15 microns and varying between 10 and 25 microns.

In this definition of the process according to the invention, the term "loosely entangled" fibers refers to fibers entangled and disordered in three dimensions, whereas the expression "fibres entangled in layers" indicates an entanglement of the fibers substantially in only two dimensions. The examples which will be given later, as well as the photographs attached to the present description will render these definitions explicit to one skilled in the art. In this definition, the thickness of the layers of capillary fibres is not specified, and the reason for this is that this value varies as a function of the degree of compression to which these layers are subjected and that furthermore, the difference of the variation is considerable between compositions of different nature.

To determine the minimum quantity of the actual volume of the adsorbant support, the storage chamber has been filled in an amount of 40% which corresponds to a storage of 12.8 cm$^3$ of liquid butane in a chamber of total volume of 32 cm$^3$. This criteria may appear to be arbitrary but it permits definition with precision of the domain covered by the process of the invention.

Furthermore, the invention is also concerned with apparatus for effecting the process and particularly to apparatus for the storage of combustible gas in the feed reservoir of a lighter having a burner directly connected to the evacuation orifice of the reservoir without auxiliary gas evaporation apparatus and without auxiliary expansion apparatus.

It follows from the preceding that the process of storage according to the invention presents a difference in principle from the known processes.

In fact, if a porous material could be compressed in such manner that it no longer had any free space between the fibers, nor between the walls of the storage chamber and the fibrous material, it would not be practically possible to make it adsorb a liquid. This is why, up to the present, it has been sought in known apparatus having a liquefied gas whose storage chamber is filled with an adsorbant support to compress the adsorbant support as little as possible in order to leave the maximum free space in which the liquefied gas can be stored.

In contrast, the applicant contemplates not to store the maximum quantity of liquefied gas in a given chamber, but to obtain an apparatus having an exclusively gaseous discharge. To this end, it is necessary to augment to a certain degree the quantity of adsorbant support in a given chamber, which is equivalent to compressing the adsorbant support in said chamber.

However, contrary to what one might assume, from the fact that this compression necessarily leads to a diminution of the free space in which it is possible to store the liquefied gas, it has been found from tests that the degree of possible fill for an apparatus with exclusive gaseous discharge increases up to a certain value when the utilized adsorbant support is compressed.

It is in this province that the assembled results in one of the annexed drawings will be studied hereafter.

DETAILED DESCRIPTION

Figure 1:
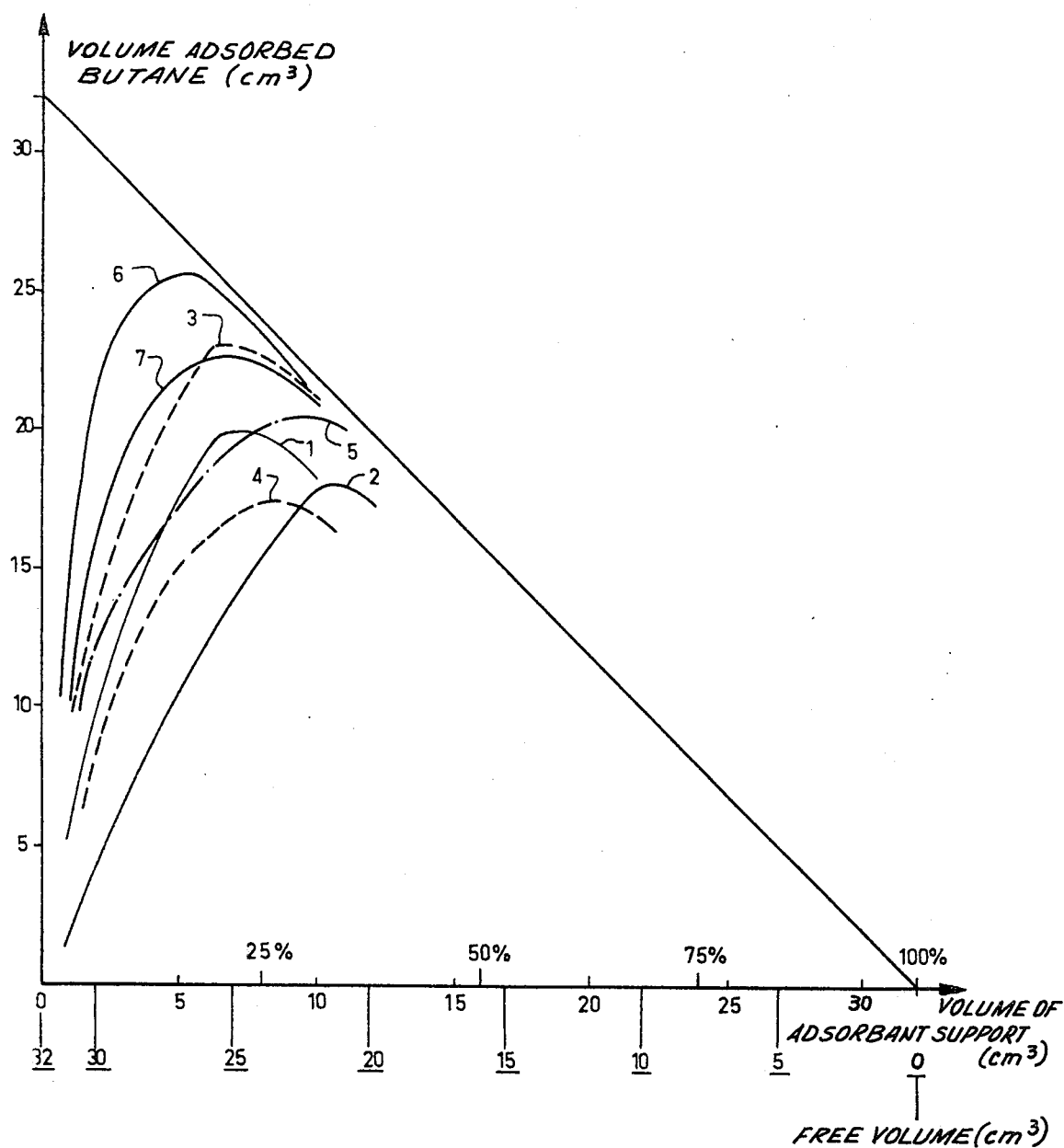
FIG. 1 is a graph referring to about 100 tests of the storage of butane with diverse adsorbant fibrous supports.
Figure 2:
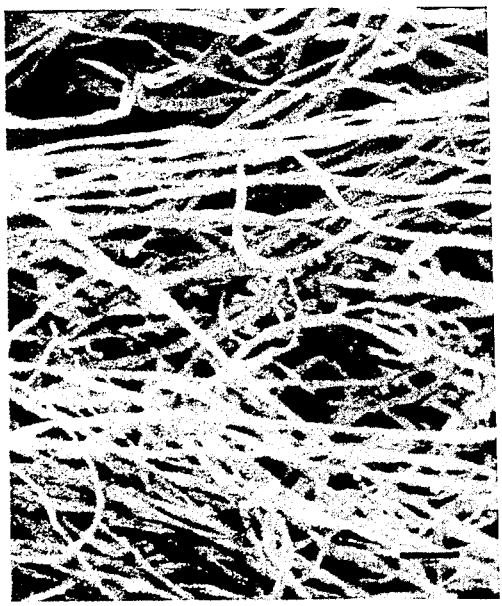
FIG. 2 is a photograph enlarged 100 times of cotton fibers entangled in a layer utilized in one of the tests to be described hereafter.
Figure 3:
FIG. 3 is a photograph enlarged 100 times, of loosely entangled polyolefin fibers utilized in one of the tests to be described hereafter.

Referring firstly to FIG. 1 where there is shown, in the form of curves, the results of tests for the storage of butane effected with the following adsorbant supports:

Curve 1: loose acrylic fibres from 12 to 22 microns in diameter;

Curve 2: cotton disposed in layers and constituted of oriented fibers from 10 to 23 microns in diameter;

Curve 3: cotton having fibres of the same diameter but loose (FIG. 2);

Curve 4: polyamide felt disposed in layers and constituted of fibers of 12 to 24 microns in diameter;

Curve 5: polyamide felt as above but shredded;

Curve 6: polyolefin disposed in layers and constituted of fibers from 0.5 to 8 microns in diameter;

Curve 7: polyolefin constituted of fibers from 0.5 to 8 microns disposed loosely (FIG. 3).

The butane utilized for these tests was butane of commercial quality whose exact composition in % by weight was the following:
n - butane — 78%
isobutane — 20%
propane — 1.5%
butene, isobutene, pentanes — 0.5%

All the tests were effected in a test tube of 32 cm$^3$ at a temperature of 20° C and the process of each test was the following:
place in the test tube a certain quantity of support;
weigh the test tube to determine the weight of the adsorbant support put in place;
fill the test tube with liquefied butane;
purge the test tube by a valve situated at the bottom thereof until the butane no longer leaves in liquid phase;
weigh the test tube to determine the weight of adsorbed butane.

As it practically is impossible to determine and to measure each free space in a capillary mass more or less compressed, there is shown in the graph in FIG. 1 (non-underlined numerals on the abscissa) the actual volume of the adsorbant supports as well as the percentages of the volume of the chamber which these actual volumes represent.

The volume of the free space in which it is possible to store the butane being equal to the difference between the total volume of the test tube and the actual volume of the adsorbant support contained in the said test tube, it is possible to see in the same curve the volume of said free space. This is why on the same graph there is shown below the abscissa a scale of underlined numbers giving this volume.

The ordinate shows the volume of absorbed butane.

Each curve carries the number of the adsorbant support to which it corresponds.

From the assembly of the curves, there is derived Table I following which shows the values of liquefied butane that it is possible to store in 2 cm$^3$, 5 cm$^3$, 7 cm$^3$, and 10 cm$^3$ of actual volume of adsorbant supports having the same apparent volume, to obtain a distribution exclusively in the gaseous phase:

TABLE I

| Adsorbant Support | 2 cm$^3$ | 5 cm$^3$ | 7 cm$^3$ | 10 cm$^3$ |
| --- | --- | --- | --- | --- |
| No.1 | 8 cm$^3$ | 18 cm$^3$ | 20 cm$^3$ | 18.5 cm$^3$ |
| No.2 | 4 cm$^3$ | 10 cm$^3$ | 13.5 cm$^3$ | 18 cm$^3$ |
| No.3 | 13 cm$^3$ | 21 cm$^3$ | 23 cm$^3$ | 21 cm$^3$ |
| No.4 | — | 15 cm$^3$ | 17 cm$^3$ | 17 cm$^3$ |
| No.5 | 13 cm$^3$ | 18 cm$^3$ | 20 cm$^3$ | 21 cm$^3$ |
| No.6 | 21 cm$^3$ | 26 cm$^3$ | 24.5 cm$^3$ | 21.5 cm$^3$ |
| No.7 | 16 cm$^3$ | 22 cm$^3$ | 23 cm$^3$ | 21 cm$^3$ |

It follows, therefore, from the attached drawing as well as from Table I that the compression of the adsorbant support leads in a first phase to an augmentation of the quantity of butane that it was possible to store in a given volume while assuring its distribution in gaseous phase.

This signifies that in this first phase, the diminution of apparent volume of a given weight of adsorbant support has been more rapid than the diminution of volume of butane that it was possible to store in this apparent volume to effect a distribution exclusively in the gaseous phase without the need for any intervening special evaporation apparatus.

It is thus noted that for each capillary product tested, there exists an optimum value of the actual volume of the adsorbant support with respect to the total volume of the storage chamber.

Additionally from a multiple number of tests, it is determined that the optimum percentage of actual volume relative to the volume of the storage chamber is, for the preferred composition, the following:
polyolefine — about 15%
polyamide felt — about 25%
cotton — about 20%

Table II following gives for a constant actual volume A of adsorbant support and relative to the results of a first test the quantity of liquefied butane stored when the apparent volume of this absorbant support is reduced to 40% (second test), 25% (third test) and 10% (fourth test).

TABLE II

| | Test No. 1 | Test No. 2 | Test No. 3 | Test No. 4 |
|---|---|---|---|---|
| | Apparent volumes of the adsorbant support for a constant actual volume | | | |
| | A | 40% A | 25% A | 10% A |
| Adsorbant support No. 1 | 1 | 0.900 | 0.625 | 0.230 |
| Adsorbant Support No. 2 | 1 | 1.000 | 0.940 | 0.450 |
| Adsorbant Support No. 3 | 1 | 0.645 | 0.430 | 0.163 |
| Adsorbant Support No. 4 | 1 | 0.666 | 0.486 | 0.189 |
| Adsorbant Support No. 5 | 1 | 0.554 | 0.395 | 0.163 |
| Adsorbant Support No. 6 | 1 | 0.495 | 0.281 | 0.105 |
| Adsorbant support No. 7 | 1 | 0.550 | 0.350 | 0.131 |

The process of storage according to the invention finds direct application in all cases where a liquefied gas is distributed in an atmosphere whose pressure is less than the pressure of storage. This is the case, for example, for aerosol distributors, for apparatus for the combustion of a combustible gas and notably cigarette lighters. In unexpected fashion, it is found additionally that the reservoirs containing liquefied gas in the presence of an adsorbant fibrous support, according to the invention, liberate the gaseous phase under a pressure substantially constant without it being necessary to utilize an expansion means. This is particularly advantageous and economical for gas distributor apparatus notably for a combustible gas.

What is claimed is:

1. A process of storing a liquified gas for distribution exclusively in gaseous form into an atmosphere whose pressure is less than that of the storage chamber, the liquified gas being combustible and being stored in the storage chamber constituted by a feed reservoir of a device having a burner directly connected to an evacuation orifice of the reservoir without interposition of auxiliary gas evaporation apparatus and without auxiliary expansion apparatus, said process comprising disposing in the storage chamber conjointly with the stored liquified gas, a quantity of a fibrous capillary adsorbant support whose fibers have a diameter between 0.5 and 25 microns, the minimum value of the actual volume of the support, constituted by the volume remaining after deduction of all interstitial spaces, going from (a) 2% of the volume of the storage chamber for a capillary support having loosely entangled fibers, in a layer, of a diameter of about 0.5 microns to (b) 12% of the volume of the storage chamber for a capillary support having entangled fibers, in a layer, of a diameter of 25 microns, the amount of liquified gas disposed in the chamber corresponding to the volume of the support such that all the liquefied gas is adsorbed by the support and only gaseous form of the liquefied gas is discharged upon opening of the evacuation orifice, the said minimum value of the actual volume of the support being of such magnitude to be sufficient to insure the distribution of the liquefied gas exclusively in gaseous form to the burner without auxiliary gas evaporation apparatus and auxiliary expansion apparatus.

2. A process as claimed in claim 1 wherein the absorbant support is a polyamide felt constituted of fibers of a diameter of 12 to 24 microns disposed in layers or shredded.

3. A process as claimed in claim 2 wherein the actual volume of the polyamide felt represents about 25% of the volume of the storage chamber to store a maximum amount of liquefied gas.

4. A process as claimed in claim 1 wherein the absorbant support is constituted of polyolefin fibers of 0.5 to 8 microns in layers or loose.

5. A process as claimed in claim 4 wherein the actual volume of the polyolefin fibers represents 15% of the volume of the storage chamber to store a maximum amount of liquefied gas.

6. A process as claimed in claim 1 wherein the adsorbant support is constituted of cotton fibers of 10 to 23 microns in diameter disposed in layers or loose.

7. A process as claimed in claim 6 wherein the actual volume of the cotton fibers represents about 20% of the volume of the storage chamber to store a maximum amount of liquefied gas.

8. A process as claimed in claim 1 wherein the adsorbant support is constituted of acrylic fibers of 12 to 22 microns in diameter.

* * * * *